United States Patent [19]

Tassy

[11] Patent Number: 4,657,516
[45] Date of Patent: Apr. 14, 1987

[54] REINFLATABLE LIFE PRESERVER DEVICE

[76] Inventor: Tomas Tassy, 5221 Marmol Dr., Woodland Hills, Calif. 91364-3332

[21] Appl. No.: 806,434

[22] Filed: Dec. 9, 1985

[51] Int. Cl.$^4$ ............................................. B64D 25/02
[52] U.S. Cl. ..................................... 441/125; 280/729
[58] Field of Search ......................... 441/80, 87, 88, 92, 441/83, 106, 125, 117–119, 123, 129, 131, 132; 114/345; 280/728–730, 732, 733, 743; 2/2; 244/121, 118.5, 122 AC

[56] References Cited

U.S. PATENT DOCUMENTS

| | | | |
|---|---|---|---|
| 3,243,882 | 4/1966 | Lipkin | 244/121 |
| 3,603,535 | 9/1971 | DePolo | 244/121 |
| 3,614,127 | 10/1971 | Glance | 280/729 |
| 3,791,666 | 2/1974 | Shibamoto | 280/729 |
| 3,803,652 | 4/1974 | Uyehara | 441/123 |
| 3,985,374 | 10/1976 | Powaska | 280/730 |
| 4,360,223 | 11/1982 | Kirchoff | 280/729 |
| 4,565,535 | 1/1986 | Tassy | 441/118 |

Primary Examiner—Joseph F. Peters, Jr.
Assistant Examiner—C. T. Bartz
Attorney, Agent, or Firm—John J. Posta, Jr.

[57] ABSTRACT

A life preserver device which is constructed with an inflatable inner bag located inside an inflatable outer bag, with the device being deployed in the back of a seat in an aircraft. When extremely rough turbulence is encountered or a crash landing is envisioned, pressurized air is supplied to the inner bag through a break-away tube, causing the inner bag to inflate, expanding the outer bag around it from the back of the seat to act as an impact cushion. Following a landing in the water, the device may be removed from the seat by breaking the break-away tube and causing the device to deflate, put on by the passenger, and the inflatable outer bag reinflated by a gas cylinder prior to exiting the aircraft into the water.

2 Claims, 9 Drawing Figures

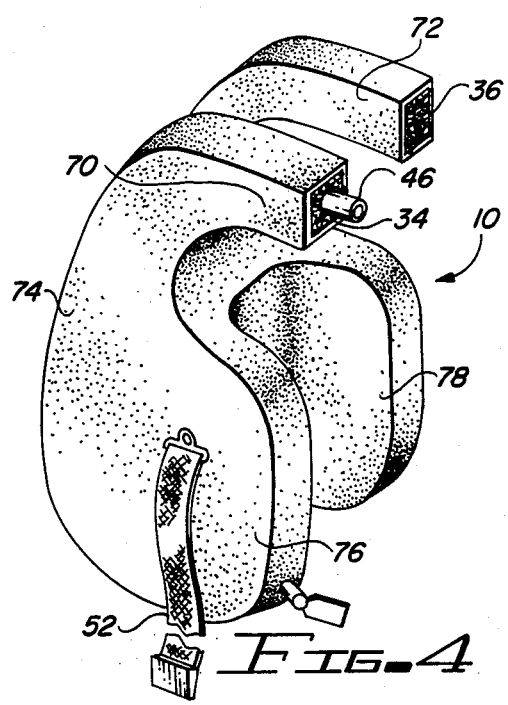
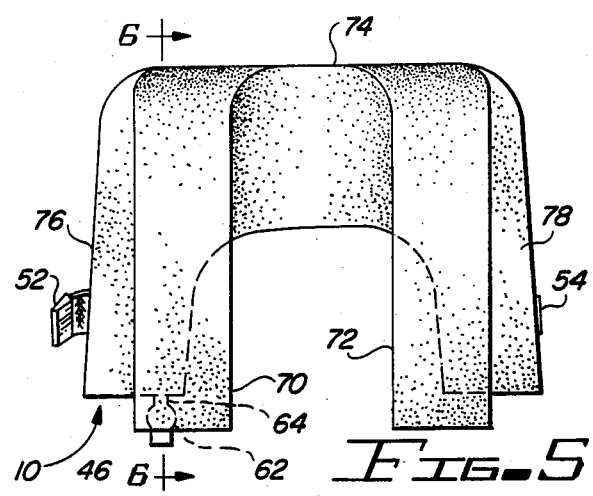
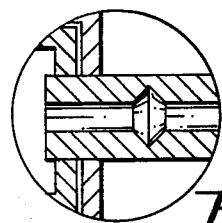
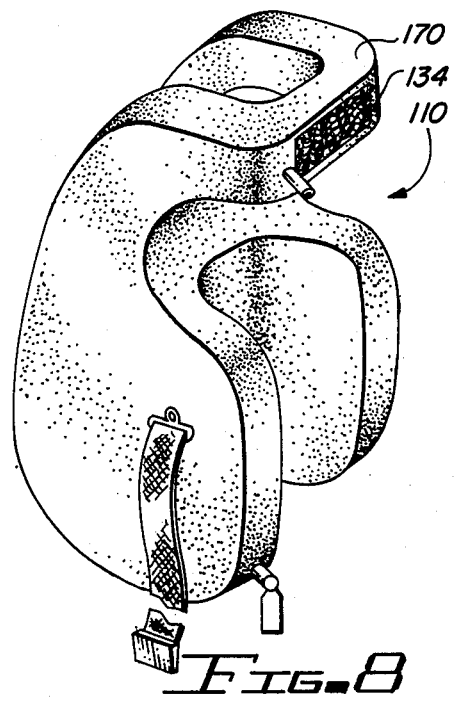
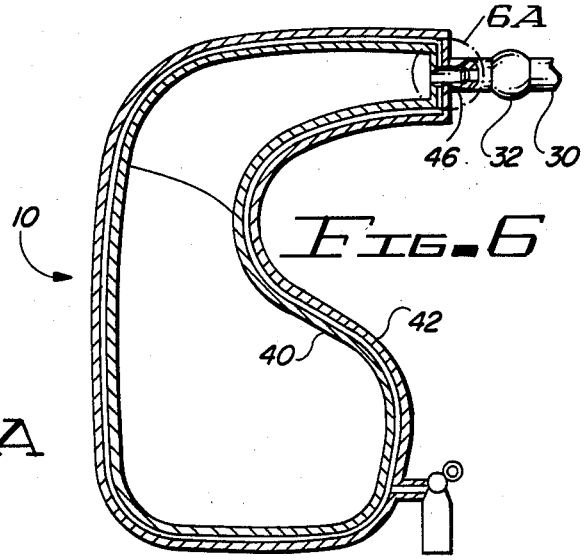
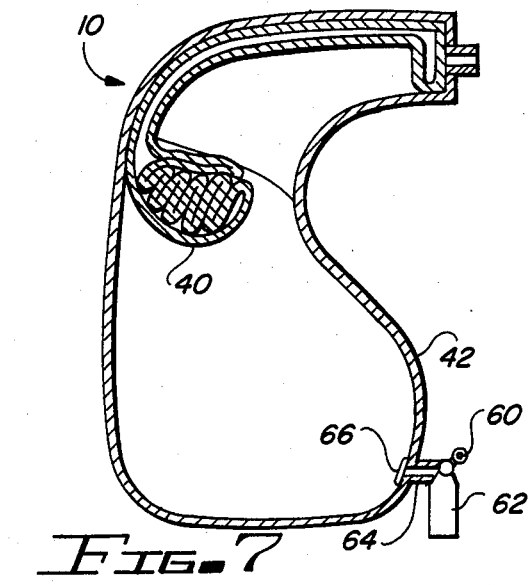

REINFLATABLE LIFE PRESERVER DEVICE

BACKGROUND OF THE INVENTION

Field of the Invention

The present invention relates generally to a life preserver, and more specifically to an improved life preserver for use in an aircraft which improved life preserver may be automatically inflated in an emergency to act as an impact cushioning device, and which may subsequently be collapsed and removed from the aircraft, and later reinflated to act as a wearable water flotation life preserver device.

Quickly inflatable pillow-like impact cushioning air bags have found application in land vehicles including cars and trucks to cushion the impact to a passenger located behind the air bag in a head-on or frontal collision. Such air bags, which are permanently connected to their containers and may be reused after deployment, are illustrated in U.S. Pat. Nos. 3,748,477 and 3,779,577.

Although many air passengers are injured every year in rough weather incidents and unexpectedly bumpy landings, air bags have not found application in aircraft. The back of aircraft seats is typically made of hard plastic, which accounts for many of the afore-mentioned injuries. Aircraft traveling over water are required to carry life preservers, which are typically either seat cushions which float and have straps attached to them, as illustrated in U.S. Pat. No. 3,762,766, or conventional Mae West type life preservers, as shown in U.S. Pat. No. 3,345,657, as well as inflatable emergency slides and rafts, as in U.S. Pat. No. 3,679,025.

As an example of a primitive attempt to adapt air bags for use in aircraft, U.S. Pat. No. 3,603,535 teaches the use of inflatable flat panels located on seats, bulkheads, and baggage racks. Such a device is of no use as a flotation device. U.S. Pat. No. 3,243,822 discloses an inflatable life jacket to be put on by aircraft passengers and inflated before a collision. This device is impractical since it does not deploy automatically and quickly, and it also has the problems of excessive bulk, inconvenience, and the suggestion of danger likely to cause panic among passengers. Other such devices which must be worn are illustrated in U.S. Pat. Nos. 462,291, 3,105,981, and 3,895,396.

The need for a inflatable personal safety device which will both protect aircraft passengers from the jolting associated with very rough weather and the shock of crashes, and will also function as a personal flotation device in case of a ditching in the water has been felt for some time. A solution to this need was presented in U.S. patent application Ser. No. 632,049, now U.S. Pat. No. 4,565,535; entitled "Improved Life Preserver Device" and invented by the inventor of the present invention, which patent application is hereby incorporated herein by reference.

In this reference an inflatable air bag is used both as an impact cushion in the event of a plane crash and as a life preserver in the event of a ditching in the water. The inflated bag is removed from its connection to a seat back after deployment, and worn by an aircraft passenger thereafter during exit from the aircraft and subsequent immersion into the water.

Unfortunately, this otherwise remarkable invention has one major disadvantage, namely that it is too bulky after deployment, making it difficult to use after the aircraft has landed in the water. The bulk of the inflated air bag makes it difficult to put on, and even more difficult to exit the aircraft while wearing the bag. As might be expected, when an aircraft is in the water, time is of the essence, and the large number of passengers all wearing the bulky developed devices while trying to leave the aircraft, possibly with the aircraft in the process of sinking, will inevitably result in a traffic jam with possible fatal consequences.

It is therefore apparent that any flotation device must be deflated and compact until the passengers leave the aircraft. If a device is to function as both an impact cushion and a life preserver, it must automatically deploy under certain conditions, and then deflate to allow passengers to exit the aircraft. Following this, the device must then reinflate quickly to operate as a life preserver.

SUMMARY OF THE INVENTION

The present invention is a reinflatable device which automatically inflates, and which may be removed from its automatic deployment position by a passenger, collapsed, and reinflated subsequent to exiting the aircraft. The present invention accomplishes this operation by utilizing a double bag construction, with an inner bag being located inside of an outer bag. When the signal is given to inflate as an impact cushion, the inner bag is quickly and automatically inflated, causing the outer bag to expand around the inner bag and pop out of a seat back in front of a passenger to protect the passenger from impact.

When movement of the aircraft ceases, the passenger pulls the device from the seat back in front of him, disconnecting the device from the air supply to the inner bag by snapping a breakaway connecting tube, and allowing the bags to be deflated. The device may then be collapsed, and fastened to the passenger by the use of a belt or belts.

The passenger may thusly exit the aircraft conveniently, since the device will be collapsed and not possess sufficient bulk to impede progress of the passenger from the plane. When the passenger exits the plane, if the plane is in the water the passenger merely pulls a valve actuator which allows gas from a compressed gas cylinder to flow through a one-way check valve into the outer bag. As the gas flows into the outer bag, any remaining gas in the inner bag will be forced out through the broken away connector tube. The inner and outer bags are fastened together securely around the broken away connector tube, so while gas may flow out of the inner bag, gas may not flow out of the outer bag.

It is therefore apparent that the device may be reinflated by the compressed gas cylinder, which is operated by the passenger. The device thus retains all of the advantage of the above-incorporated reference, such as automatic deployment from a seat back. It is useable both as an impact cushion and as a flotation device, and will not impede progress of the passengers of the aircraft to the exits of the aircraft. As such, it may be seen that the present invention represents a highly desireably solution to the problems enumerated above, and one without accompanying disadvantages.

DESCRIPTION OF THE DRAWINGS

These and other advantages of the invention are best understood with reference to the drawings, in which:

FIG. 4 is a perspective view of the inflated device shown in FIGS. 2 and 3;

FIG. 5 is a top plan view of the device shown in FIGS. 2, 3, and 4;

FIG. 6 is a cutaway view of the device shown in FIG. 5, with the inner bag inflatably deployed as in FIG. 2;

FIG. 6A is an enlarged cutaway view of the breakaway tube used to inflate and deflate the inner bag;

FIG. 7 is a cutaway view of the device shown in FIG. 6 with the inner bag collapsed and the outer bag inflatably deployed as in FIG. 3; and FIG. 8 is a perspective view of an alternate embodiment having a horizontal neck-girdling collar portion defining a head-receiving opening.

DETAILED DESCRIPTION OF THE PREFERRED EMBODIMENT

Figure 1:
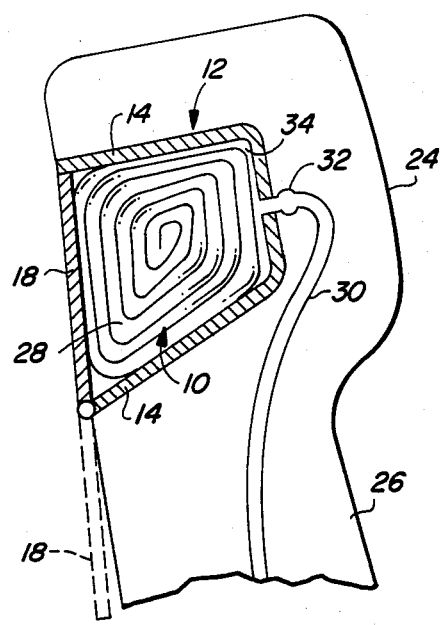
FIG. 1 is an enlarged, fragmentary side elevation, partly in section, of the preferred embodiment of the present invention mounted in the back of an aircraft passenger seat, shown with the device in an undeployed, coiled stored position.

The preferred embodiment of the present invention is illustrated in its stored position in FIG. 1. The life preserver device 10 is illustrated in a folded or coiled position within a storage container 12 consisting of a number of walls 14 and a hinged lid 18, which storage container 12 is mounted in the back of a headrest portion 24 of an aircraft seat 26. The portion of the storage container 12 made up of the walls 14 has an opening in the back of the headrest portion 24 of the seat 26, and the lid 18 is hinged at the bottom and closes by swinging upward.

In the preferred embodiment the edge of the lid 18 away from the hinged edge of the lid 18 is retained in a closed position as shown in FIG. 1 by an interference fit or a latch (not shown). When the life preserver device 10 is activated in an emergency situation, the lid 18 will be forced open by the expanding life preserver device 10, with the lid 18 opening to the position shown in phantom lines in FIG. 1.

Figure 2:
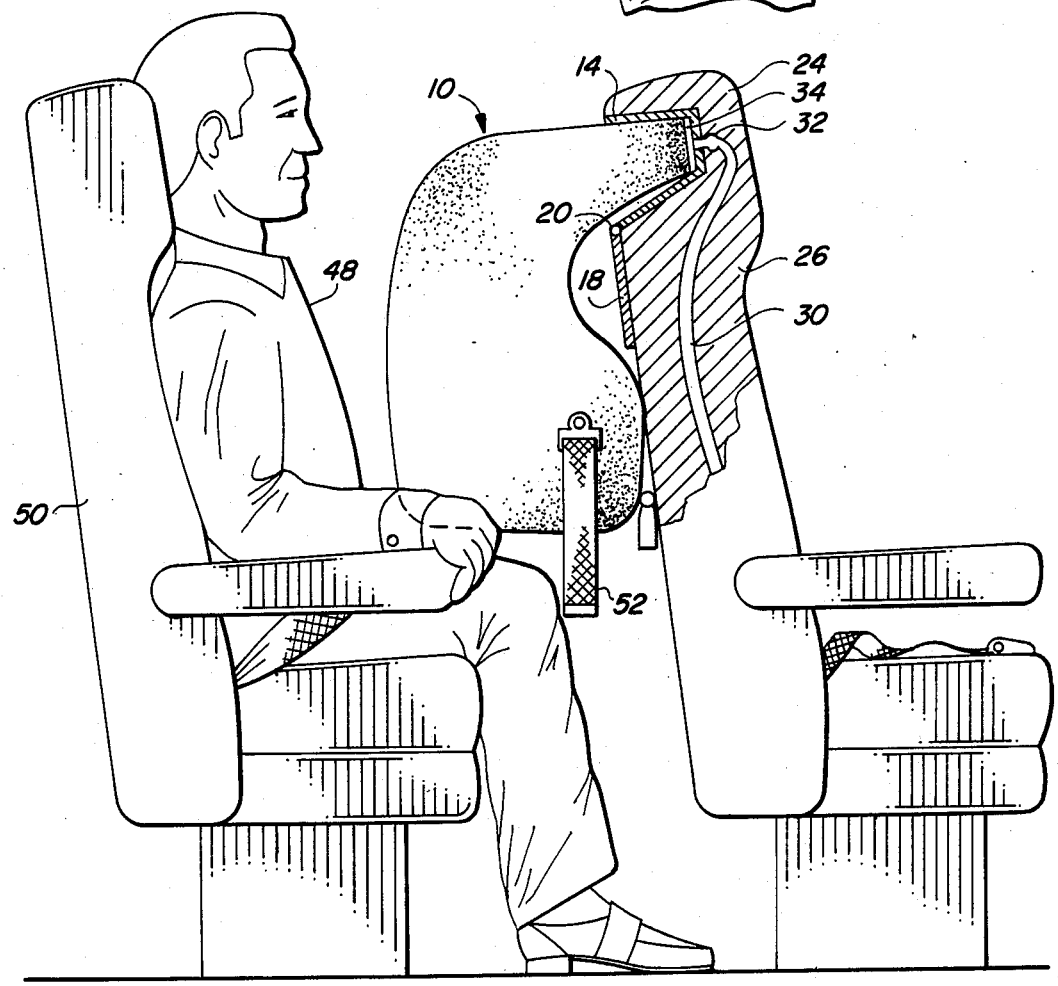
FIG. 2 is a schematic side elevation of the device of FIG. 1, with the device having the inner bag deployed to act as an impact barrier.

Pressurized gas used to activate the life preserver device 10 is supplied through a pressure supply tube 30 running from a pressurized gas supply device (not shown) through the interior of the seat 26 to a one-way valve 32, from which the pressurized gas is supplied to the life preserver device 10. The one-way valve 32 allows gas to enter the life preserver device 10, but will not allow gas to leave the life preserver device 10, thereby assuring that the life preserver device will remain inflated as long as it is needed as an impact cushion. The life preserver device 10 is illustrated in FIG. 2 inflated for use as an impact cushion.

The life preserver device 10 is releasably secured by velcro-type mating strips 34, 36 (strip 36 is not shown in FIG. 1 or 2) to the wall 14 of the container 12 opposite the opening in the container 12 created when the lid 16 is open. The velcro-type mating strips 34, 36 are secured to the life preserver device 10 and to the afore-mentioned wall 14 opposite the opening in the container 12.

The life preserver device 10 differs from applicant's above-incorporated reference in that the life preserver device 10 of the present invention consists of a first or inner bag 40 located inside a second or outer bag 42, as shown in FIGS. 5-7. Both the inner bag 40 and the outer bag 42 are shaped the same, with the inner bag 40 being slightly smaller than the outer bag 42, to fit closely within the outer bag 42 when the inner bag 40 is inflated. Both bags 40, 42 may be made of rubber, rubberized or plasticized cloth, plastic, or the like, which materials are all relatively light and readily inflatable as well as stable and durable for long periods of time when stored.

As stated above, pressurized gas to inflate the life preserver device 10 is supplied through a pressure supply tube 30 to a one-way valve 32. The one-way valve 32 is connected to the inner bag 40 by a breakaway tube 46, which extends through the outer bag 42 into the inner bag 40. It is important to note that gas cannot be supplied to the area between the inner bag 40 and the outer bag 42 from the breakaway tube 46. Preferably, the inner bag 40 and the outer bag 42 are joined together in the area around the breakaway tube 46, as by heat welding of the bags or by the use of adhesive, for example. An enlarged view of this area is shown in FIG. 6A.

It may thusly be appreciated that in an emergency such as extreme turbulence or a prospective rough landing, the life preserver device 10 may be activated as an impact cushion by supplying pressurized gas through the pressure supply tube 30 to inflate the inner bag 40, opening the lid 18 and deploying the life preserver device 10 as shown in FIGS. 2 and 6. Referring now to FIG. 2, it may be seen that when the life preserver device 10 is inflated by the inner bag 40 (FIG. 6) as previously described, it provides an impact cushion for a passenger 48 in a second seat 50 located directly behind the seat 26 in which the device 10 is located. This impact cushion would prevent the passenger 48 from plunging into the seat 26 ahead of the passenger 48 during rough weather or on impact of the plane with the ground or into the water when crash landing.

Following a crash landing in the water, the life preserver device 10 may be removed by pulling it out of the container 12, thereby separating the mating velcro-type strips 34, 36 on the device 10 and the wall 14 of the container 12 and also breaking the breakaway tube 46 at the weakened location illustrated in FIG. 6A. This separates the inflated inner bag 40 from the one-way valve 32 retaining gas in the inner bag 40, and causes the inner bag 40 to collapse. Since there is no gas between the inner bag 40 and the outer bag 42, the outer bag 42 will also collapse. If desired, the device 10 may be further collapsed manually.

It is apparent that the collapsed life preserver device 10 will not be very bulky, and may be easily taken off the aircraft due to its lack of troublesome bulk. The life preserver device 10 may be worn by the passenger 48 as he leaves the seat 50, or it may be put on prior to leaving the aircraft in the water. The life preserver device 10 also includes means for releasably securing it about the passenger 48. This means may include a flexible strap 52 on one side of the device 10 and adapted to be releasably secured to a small slip buckle 54 (FIG. 5) or velcro-type strip on the opposite side of the device 10.

Figure 3:
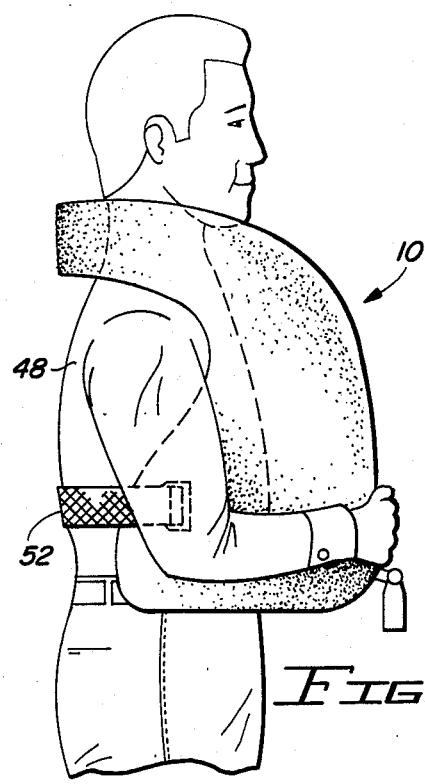
FIG. 3 is a schematic side elevation of the device of FIG. 2 releasably secured around a standing passenger, with the outer bag deployed to act as a personal water flotation device.

Immediately prior to leaving the aircraft and entering the water, the life preserver device 10 may be reinflated by pulling a pin or pull strap 60 to cause a small compressed gas cylinder 62 to supply pressurized gas through a short tube 64 into the outer bag 42. As the outer bag 42 is pressurized, the inner bag 40 will be collapsed completely within the outer bag 42, as shown in FIG. 7. The inner bag 40 and the outer bag 42 are fastened together securely around the broken away portion of the breakaway tube 46, so while gas may flow out of the inner bag 40, gas may not flow out of the outer bag 42. A second one-way valve 66 is located at the end of the short tube 64 inside the outer bag 42, or in the short tube 64 supplying pressurized gas to the outer bag 42, to prevent gas from leaking from the outer bag 42. The reinflated life preserver device 10 is illustrated in FIGS. 3 and 4.

The preferred outer shape of the life preserver device 10 is shown in FIGS. 4 and 5 to have an upper, horizontal neck-stradling collar portion consisting of two arms 70, 72 which may extend around the sides of a neck and through whiich a head may extend. The arms 70, 72 may also have a strap (not shown) connecting the extremities of the arms 70, 72. The two arms 70, 72 are connected to a lower, generally vertical portion 74, which is in turn connected to a pair of spaced sides 76, 78, which spaced sides 76, 78 together with the vertical portion 74 define a chest-receiving portion.

An alternate outer shape is illustrated in FIG. 8, in which a device 110 has an upper, horizontal neck-girdling collar portion 170 defining a central head-receiving opening. The collar portion 170 has a single velcro-type mating strip 134 thereon. In all other respects, including function, the device 110 is identical to the preferred embodiment illustrated in FIGS. 1-7. It is apparent that many other configurations could easily be designed using the same principles of operation.

The present invention thus provides a convenient and advantageous solution to the problems enumerated above. It functions as both an automatically deployable impact cushion and as a wearable flotation device. Since it is reinflatable, it may be collapsed to allow easy passage out of the aircraft, and reinflated upon leaving the aircraft for the water. The reinflatable life preserver device of the present invention therefore is a desirable dual function safety device for aircraft, and possesses no significant disadvantages.

It will be apparent to those skilled in the art that a number of changes, modifications, or alterations to the present invention as described herein may be made, none of which depart from the spirit of the present invention. All such changes, modifications, and alterations should therefore be seen as within the scope of the present invention.

What is claimed is:

1. An improved life preserver device for mounting in the back of an aircraft seat, comprising:

an inflatable outer bag for removeable deployment in an uninflated state in said back of said aircraft seat;

an inflatable inner bag located inside said inflatable outer bag;

means operably, removeably connected to said inflatable inner bag for supplying a pressurized gas to said inflatable inner bag to cause said inflatable inner bag to fill with pressurized gas, the expansion of said inflatable inner bag causing a corresponding expansion of said inflatable outer bag around said inflatable inner bag, said inflatable inner and outer bags extending from said back of said airline seat to form an impact cushion when said supply means fills said inflatable inner bag, said inflatable inner and outer bags being removeable from said back of said seat when said supply means is disconnected from said inflatable inner bag, said inflatable inner bag and said inflatable outer bag both collapsing when said supply means is disconnected from said inflatable inner bag;

means connected to said inflatable outer bag for securing said inflatable outer bag to a passenger; and means for selectively inflating said inflatable outer bag to expand said inflatable outer bag while compressing said inflatable inner bag within said inflatable outer bag by causing pressurized gas remaining within said inflatable inner bag to be expelled;

means for supplying pressurized gas through said back of said seat;

a breakaway tube having one end connected to said inner bag through said outer bag, said one end of said breakaway tube being removable from the other end of said breakaway tube;

a first one-way valve interposed between said supply means and said other end of said breakaway tube, said first one-way valve allowing pressurized gas to flow from said supply means into said inner bag through said breakaway tube but preventing the flow of gas in the opposite direction therethrough, said inner and outer bags being removeable from the back of said seat when said breakaway tube is broken to separate said one end of said breakaway tube from said other end of said breakaway tube, gas escaping from said inner bag and said inner and outer bags collapsing when said breakaway tube is broken.

2. An improved life preserver device for mounting in the back of a aircraft seat, comprising:

a storage container mounted in said back of said aircraft seat, said storage container having an openable lid thereon covering an opening in said storage container facing rearwards;

an inflatable body contoured outer bag releasably connected to the interior of said storage container;

an inflatable inner bag contained within said outer bag, said inner bag being contoured to fit exactly within the interior of said outer bag when said inner bag is inflated;

means for supplying pressurized gas through said back of said seat to said storage container;

a breakaway tube having one end connected to said inner bag through said outer bag, said one end of said breakaway tube being removeable from the other end of said breakaway tube;

a first one-way valve interposed between said supply means and said other end of said breakaway tube, said first one-way valve allowing pressurized gas to flow from said supply means into said inner bag through said breakaway tube but preventing the flow of gas in the opposite direction therethrough, said inner bag expanding and causing said outer bag to expand when said inner bag is filled with pressurized gas from said supply means, said inner and outer bags extending out from said storage container when said inner bag is filled, said inner and outer bags being removeable from said storage compartment when said breakaway tube is broken to separate said one end of said breakaway tube from said other end of said breakaway tube, gas escaping from said inner bag and said inner and outer bags collapsing when said breakaway tube is broken;

belt means for fastening said outer bag to a passenger for use as a flotation device;

a compressed gas cylinder having a manually operable valve thereon to initiate the flow of compressed gas from said cylinder;

a tube leading from said valve to said outer bag, said tube providing compressed gas to the interior of said outer bag when said flow of compressed gas from said cylinder is initiated; and a second one-way valve to allow compressed gas to flow from said tube into said outer bag but to prevent the flow of gas in the opposite direction.

* * * * *